(12) United States Patent
Terada et al.

(10) Patent No.: US 7,590,591 B2
(45) Date of Patent: Sep. 15, 2009

(54) ELECTRONIC VALUE EXCHANGE SYSTEM AND ELECTRONIC VALUE EXCHANGE METHOD

(75) Inventors: Masayuki Terada, Yokosuka (JP); Kensaku Mori, Yokohama (JP); Kazuhiko Ishii, Yokohama (JP); Sadayuki Hongo, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 736 days.

(21) Appl. No.: 11/372,131

(22) Filed: Mar. 10, 2006

(65) Prior Publication Data

US 2006/0212394 A1 Sep. 21, 2006

(30) Foreign Application Priority Data

Mar. 14, 2005 (JP) ............... P2005-071744

(51) Int. Cl.
*G06Q 99/00* (2006.01)

(52) U.S. Cl. ............... 705/37; 713/187; 380/44; 705/65; 705/69

(58) Field of Classification Search .......... 705/37, 705/69, 65; 713/187; 380/44; 235/379
See application file for complete search history.

(56) References Cited

U.S. PATENT DOCUMENTS

| 6,047,887 | A * | 4/2000 | Rosen | 235/379 |
| 2003/0070080 | A1 * | 4/2003 | Rosen | 713/187 |
| 2007/0135164 | A1 | 6/2007 | Lee | |

FOREIGN PATENT DOCUMENTS

| JP | 2001-143009 | 5/2001 |
| JP | 2003-25675 | 1/2003 |
| JP | 2004-341643 | 12/2004 |
| KR | 2002-0063351 | 8/2002 |
| KR | 10-0578148 | 5/2006 |

OTHER PUBLICATIONS

Takac, Paul F; EDI, EFT and implications for banks; 1993; Logistics Information Management, v6n1, p. 8-15.*
N. Asokan, "Fairness in Electronic Commerce", Ph.D Thesis, University of Waterloo, 1998, 179 pages.
Henning Pagnia, et al., "Fair Exchange", The Computer Journal, pp. 1-22.
Eingereicht von Matthias Schunter, "Optimistic Fair Exchange", Ph.D Thesis, University of Saarland, Oct. 2000, 258 pages.

* cited by examiner

*Primary Examiner*—Behrang Badii
(74) *Attorney, Agent, or Firm*—Oblon, Spivak, McClelland, Maier & Neustadt, P.C.

(57) ABSTRACT

When a portable terminal receives a condition for an exchange object from a portable terminal, it selects electronic values as exchange objects, out of lists constituting the condition. An IC card deletes the electronic value and sends a message addressed to the portable terminal. An IC card deletes the electronic value in conjunction with fulfillment of a predetermined condition and thereafter sends a message addressed to the IC card. The IC card stores the electronic value in conjunction with fulfillment of a predetermined condition and sends a message addressed to the IC card. The IC card stores the electronic value.

4 Claims, 4 Drawing Sheets

ELECTRONIC VALUE EXCHANGE SYSTEM AND ELECTRONIC VALUE EXCHANGE METHOD

BACKGROUND OF THE INVENTION

1. Field of the Invention

The present invention relates to a technology of exchanging electronic values as information electronically representing values.

2. Related Background Art

There is the conventionally proposed technology of safely circulating information electronically representing values (hereinafter referred to as "electronic values"), including electronic money and electronic tickets. For example, the original data circulation method disclosed in Japanese Patent Application Laid-Open No. 2001-143009 implements safe circulation by enabling device-device exchange and use of electronic values issued to users, while preventing reproduction and forgery of the electronic values.

The above original data circulation method provides the safety of circulation but does not always assure fairness of trade. Here the fair trade is a trade satisfying the condition that "neither of two parties involved in an attempt of mutual exchange of electronic values loses the electronic value of itself, without acquiring an electronic value as a consideration or without obtaining a guarantee for acquisition thereof". Namely, in the case of the aforementioned original data circulation method, when an exchange transaction is interrupted, for example, by an abnormality of communication or a fraud of a transaction partner on the occasion of exchanging electronic values E1, E2 held by respective devices D1, D2 of users, D1 could lose E1 without acquisition of E2.

A document disclosing a technology to overcome this disadvantage is, for example, Japanese Patent Application Laid-Open No. 2004-341643. This technology enables an exchange of electronic values in a transaction under a normal condition, i.e., in a transaction satisfying the condition that a communication line between the devices D1 and D2 is not interrupted from start to end of the transaction and that D1 and D2 both cooperate to fulfill the transaction. On the other hand, under abnormal conditions, a third-party device is used to enable recovery of fairness of the transaction even from a midway point of the transaction.

SUMMARY OF THE INVENTION

In the conventional electronic value exchange technology described above, however, the device D1 to start a trade must fix E1 as an object of the trade at the start of the trade, and this raises the following problem of concern. For example, suppose D1 holds E1a and E1b as electronic values. The user of D1 desires to exchange only either one of E1a and E1b, for E2 held by D2. At this time, the user of D1 needs to decide which electronic value is used as E1 and needs to give D2 the electronic value which is not used as E1, prior to the start of the exchange transaction.

However, in the case where the user of D1 selects E1a as an exchange object, let us assume that the user of D2 has such preference that "E2 may be exchanged for E1b but not for E1a". In this case, the devices D1, D2 will interrupt the exchange transaction once started, and again execute a new exchange transaction. This situation can be prevented if the users are informed of the exchange objects in advance. However, it requires an additional procedure and this can be a factor to degrade processing efficiency and system performance.

An object of the present invention is therefore to implement such an exchange of electronic values that a user is allowed to arbitrarily designate any electronic value to satisfy a condition, as an exchange object, while maintaining high security.

An electronic value exchange system according to the present invention is an electronic value exchange system for implementing an exchange of electronic values stored in a first storage device of a first communication terminal and in a second storage device of a second communication terminal, respectively, the first communication terminal comprising: output means for acquiring condition information containing a first condition for a first electronic value as an exchange object on the first communication terminal, and a second condition for a second electronic value as an exchange object on the second communication terminal, and for outputting the condition information to the first storage device; and transmitting means for transmitting offer information containing the condition information and a first random number generated by the first storage device, to the second communication terminal; the second communication terminal comprising: determining means for determining the first and second electronic values as exchange objects, using the condition information contained in the offer information transmitted by the transmitting means; the second storage device comprising: generating means for performing: generation of session information from a second random number generated by the second storage device; generation of agreement object information from the first and second electronic values and the first random number; and generation of a first electronic signature from first signature object information using the session information and the agreement object information; and managing means for deleting the second electronic value; the second communication terminal further comprising: transmitting means for transmitting agreement information containing the first signature object information, the first electronic signature, and the first and second electronic values, to the first communication terminal; the first communication terminal further comprising: verifying means for verifying the agreement information and for outputting the agreement information as confirmation request information to the first storage device; the first storage device further comprising: authenticating means for performing an authentication of the second storage device, based on whether the first electronic signature and the agreement object information contained in the confirmation request information satisfy a predetermined condition; generating means for, when the authentication is successfully done, generating a second electronic signature from second signature object information using the session information and sending a first confirmation information containing the session information and the second electronic signature, to the second storage device; and managing means for deleting the first electronic value when the authentication is successfully done; the second storage device further comprising: authenticating means for performing an authentication of the first storage device, based on whether the second electronic signature and the session information satisfy a predetermined condition, out of the first confirmation information containing the session information and the second electronic signature; wherein the managing means makes the first electronic value stored in storage means when the authentication is successfully done; wherein the transmitting means of the second communication terminal transmits second confirmation information containing the second random number to the first communication terminal; wherein the authenticating means of the first storage device performs an authentication of the second storage device, based on whether the second random number contained in the second confirmation information is one corresponding to the session information of the first signature object information contained in the confirmation request information; and wherein the managing means of the first storage device makes the second electronic value stored in storage means when the authentication is successfully done.

An electronic value exchange method according to the present invention is an electronic value exchange method of implementing an exchange of electronic values stored in a first storage device of a first communication terminal and in a second storage device of a second communication terminal, respectively, the electronic value exchange method comprising the following steps: letting the first communication terminal execute: a step of acquiring condition information containing a first condition for a first electronic value as an exchange object on the first communication terminal and a second condition for a second electronic value as an exchange object on the second communication terminal, and outputting the condition information to the first storage device; and a step of transmitting offer information containing the condition information and a first random number generated by the first storage device, to the second communication terminal; letting the second communication terminal execute: a step of determining first and second electronic values as exchange objects, using the condition information contained in the transmitted offer information; letting the second storage device execute: a step of performing: generation of session information from a second random number generated by the second storage device; generation of agreement object information from the first and second electronic values and the first random number; and generation of a first electronic signature from first signature object information using the session information and the agreement object information; and a step of deleting the second electronic value; letting the second communication terminal execute: a step of transmitting agreement information containing the first signature object information, the first electronic signature, and the first and second electronic values to the first communication terminal; letting the first communication terminal execute: a step of verifying the agreement information and outputting the agreement information as confirmation request information to the first storage device; letting the first storage device execute: a step of performing an authentication of the second storage device, based on whether the first electronic signature and the agreement object information contained in the confirmation request information satisfy a predetermined condition; a step of, when the authentication is successfully done, generating a second electronic signature from the second signature object information using the session information and sending a first confirmation information containing the session information and the second electronic signature, to the second storage device; and a step of deleting the first electronic value when the authentication is successfully done; letting the second storage device execute: a step of performing an authentication of the first storage device, based on whether the second electronic signature and the session information satisfy a predetermined condition, out of the first confirmation information containing the session information and the second electronic signature; and a step of storing the first electronic value when the authentication is successfully done; letting the second communication terminal execute a step of transmitting second confirmation information containing the second random number to the first communication terminal; letting the first storage device execute a step of performing an authentication of the second storage device, based on whether the second random number contained in the second confirmation information is one corresponding to the session information of the first signature object information contained in the confirmation request information; and letting the first storage device execute a step of storing the second electronic value when the authentication is successfully done.

According to these aspects of the invention, the second communication terminal first selects an electronic value out of those satisfying the exchange object condition acquired by the first communication terminal, and then the exchange of electronic values starts. In other words, the first communication terminal does not have to fix an electronic value as an exchange object but simply presents the condition for it to the second communication terminal, and then the second communication terminal can start the exchange of desired electronic values with the first communication terminal. The electronic value deleting process and storing process at the two terminals, for implementing the exchange of electronic values, are executed only if the aforementioned conditions are met. In the process of exchanging the electronic values, therefore, the system and method permit the user to arbitrarily designate any electronic value satisfying the conditions, as an exchange object, while maintaining high security.

On the occasion of verifying the agreement information, the verifying means verifies, for example, whether the first electronic value in the agreement information satisfies the first condition and whether the second electronic value in the agreement information satisfies the second condition. If the two conditions are met, the agreement information can be outputted as the confirmation request information to the first storage device. Among the predetermined conditions, the predetermined condition in the authentication by the authenticating means of the first storage device is, for example, a condition including at least that the first electronic signature is a regular signature for the first signature object information and that the agreement object information is one corresponding to the first and second electronic values and the first random number. On the other hand, the predetermined condition in the authentication by the authenticating means of the second storage device is, for example, a condition including at least that the second electronic signature is a regular signature for the second signature object information and that the session information is one corresponding to the second random number.

In the foregoing electronic value exchange system, the first and second communication terminals can be portable terminals and the first and second storage devices can be IC cards. When the present invention is applied to the exchange of electronic values between IC cards connected to portable terminals with excellent portability as in this case, it becomes feasible to implement the exchange of electronic values with higher flexibility and with higher security. As a result, circulation of electronic values is promoted.

The present invention enables implementation of such exchange of electronic values that the user is allowed to arbitrarily designate any electronic value satisfying the condition, as an exchange object, while maintaining high security.

DESCRIPTION OF THE PREFERRED EMBODIMENTS

Figure 1:
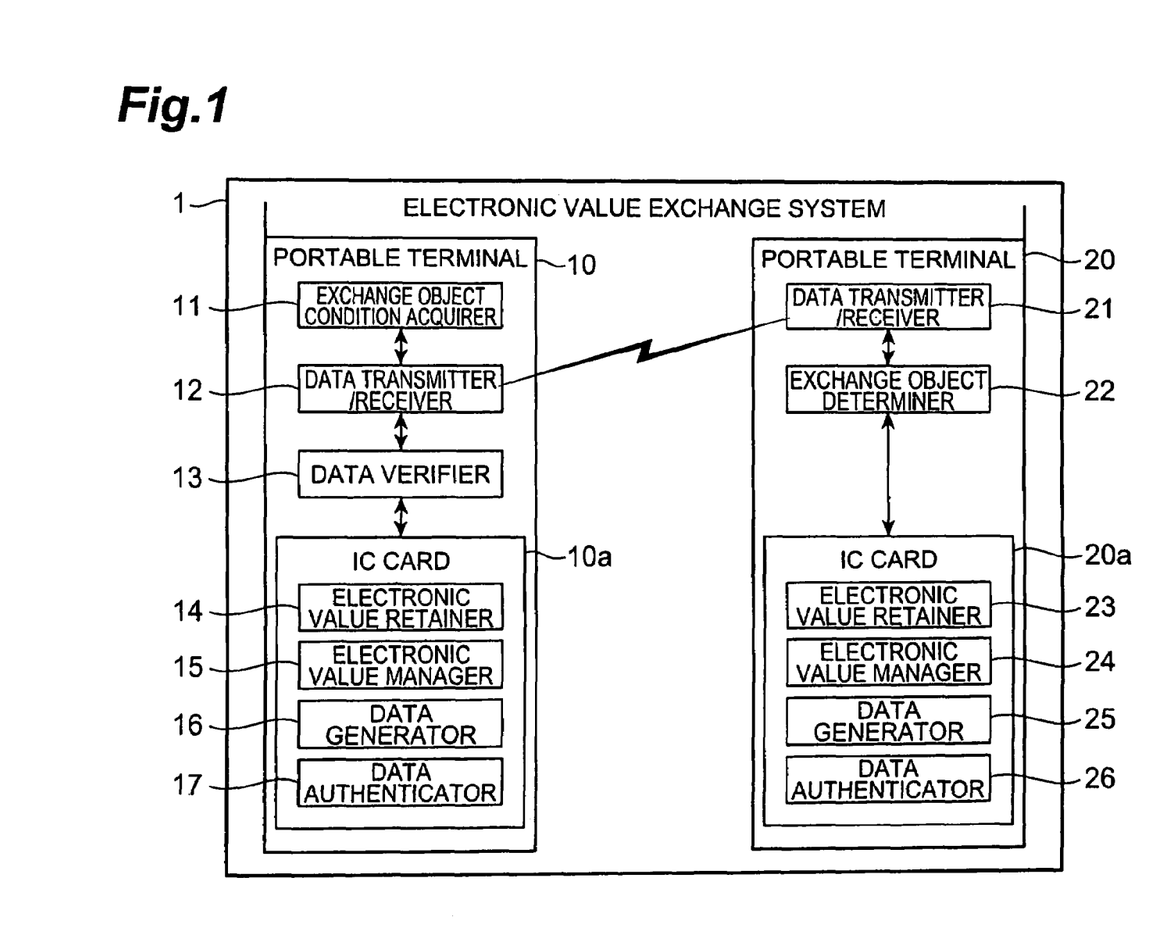
FIG. 1 is an illustration showing a functional configuration of an electronic value exchange system in an embodiment of the present invention.

An embodiment of the present invention will be described below with reference to the accompanying drawings presented for illustrative purposes only. Electronic value exchange system 1 in the present embodiment, as shown in FIG. 1, comprises two portable terminals 10, 20 (corresponding to communication terminals) capable of transmission/reception of data to and from each other. The portable terminals 10, 20 are provided with respective IC cards 10a, 20a (corresponding to storage devices) detachably mounted. The portable terminal 10 is, for example, a cell phone or PDA (Personal Digital Assistance), but can be any terminal device with a communication function, without any restrictions on its function and use.

The portable terminal 10 is comprised of exchange object condition acquirer 11 (corresponding to the outputting means), data transmitter/receiver 12 (corresponding to the transmitting means), data verifier 13 (corresponding to the verifying means), and IC card 10a. Furthermore, the IC card 10a is comprised of electronic value retainer 14, electronic value manager 15 (corresponding to the managing means), data generator 16 (corresponding to the generating means), and data authenticator 17 (corresponding to the authenticating means). These components are connected so as to be able to import and export signals from and to each other through a bus. The IC card 10a has tamper resistance enough to secure high confidentiality and resistance to external programs and devices.

The functions of the respective components will be described below. The exchange object condition acquirer 11 acquires an exchange object condition C entered by a user of the portable terminal 10 and outputs a Start Exchange signal with this condition C as a parameter to the IC card 10a. The data transmitter/receiver 12 performs transmission/reception of various signals to and from the portable terminal 20. For example, it performs transmission of an Offer signal containing condition C and random number n1 as elements, or reception of a Commitment signal containing random number n2 as an element.

When detecting reception of an Agreement signal, the data verifier 13 verifies whether V1 (corresponding to the first electronic value) in the signal belongs to list C1 of the condition C, and outputs the result of the verification. Similarly, it also verifies whether V2 (corresponding to the second electronic value) in the Agreement signal belongs to list C2.

The electronic value retainer 14 retains electronic values including the electronic values V1, V2 as exchange objects. The electronic value manager 15 performs deletion of an electronic value retained in the electronic value retainer 14, and storage of an electronic value not retained.

The data generator 16 retains a public key P1, together with its certificate CertP1 issued by a certificate authority, and generates an electronic signature SigP1(m) that can be verified by the public key P1. The parameter m represents a message as a signature object. The detailed processing contents will be described later in the description of the operation, but the data generator 16 generates the foregoing random number n1 and generates an Offer signal with this n1 and condition C as elements. In addition, it generates an electronic signature Se=SigP1(s2).

The data authenticator 17 performs authentication of IC card 20a being an exchange partner of electronic values, based on an after-described Confirm Exchange signal {s1|s2, Sa,CertP2,V1,V2}.

The portable terminal 20 is an exchange partner of the portable terminal 10 and selects electronic values V1, V2 as exchange objects. For this reason, the portable terminal 20 basically has much the same configuration as the portable terminal 10, but is different therefrom in that the portable terminal 20 has exchange object determiner 22. The portable terminal 20 is comprised of data transmitter/receiver 21 (corresponding to the transmitting means), exchange object determiner 22 (corresponding to the determining means), and IC card 20a. Just as the IC card 10a was, the IC card 20a is comprised of electronic value retainer 23, electronic value manager 24 (corresponding to the managing means), data generator 25 (corresponding to the generating means), and data authenticator 26 (corresponding to the authenticating means). These components are connected so as to be able to import and export signals from and to each other through a bus.

The description of the components common to the portable terminals 10, 20 is omitted herein, and the exchange object determiner 22 will be described below. When detecting reception of an Offer signal transmitted from the portable terminal 10, the exchange object determiner 22 extracts the condition C for exchange objects from the signal. The exchange object determiner 22 acquires lists C1, C2 from the condition C and makes them displayed on a display device (not shown), and thereafter awaits selection of exchange objects V1, V2. When a user of the portable terminal 20 selects V1 out of electronic values listed in list C1 and selects V2 out of electronic values listed in list C2, the exchange object determiner 22 outputs these exchange objects V1, V2, together with first random number n1, to the IC card 20a.

Next, the operation of the electronic value exchange system 1 in the present embodiment and each of steps constituting an electronic value exchange method according to the present invention will be described with reference to FIGS. 2 to 4. The description of the operation is based on the assumption that the electronic value exchange system 1 enables any portable terminal user to perform an exchange of any electronic values within the scope of the exchange object condition. It is presumed in the present embodiment, particularly, that the user of portable terminal 20 selects any one electronic value as electronic value V1 of an exchange object out of the list C1 of electronic values provided by the portable terminal 10 and that the user of the portable terminal 20 selects any one electronic value as electronic value V2 of an exchange object out of the electronic value list C2 on the portable terminal 20 side disclosed on a sales board or the like by himself or herself.

Figure 2:
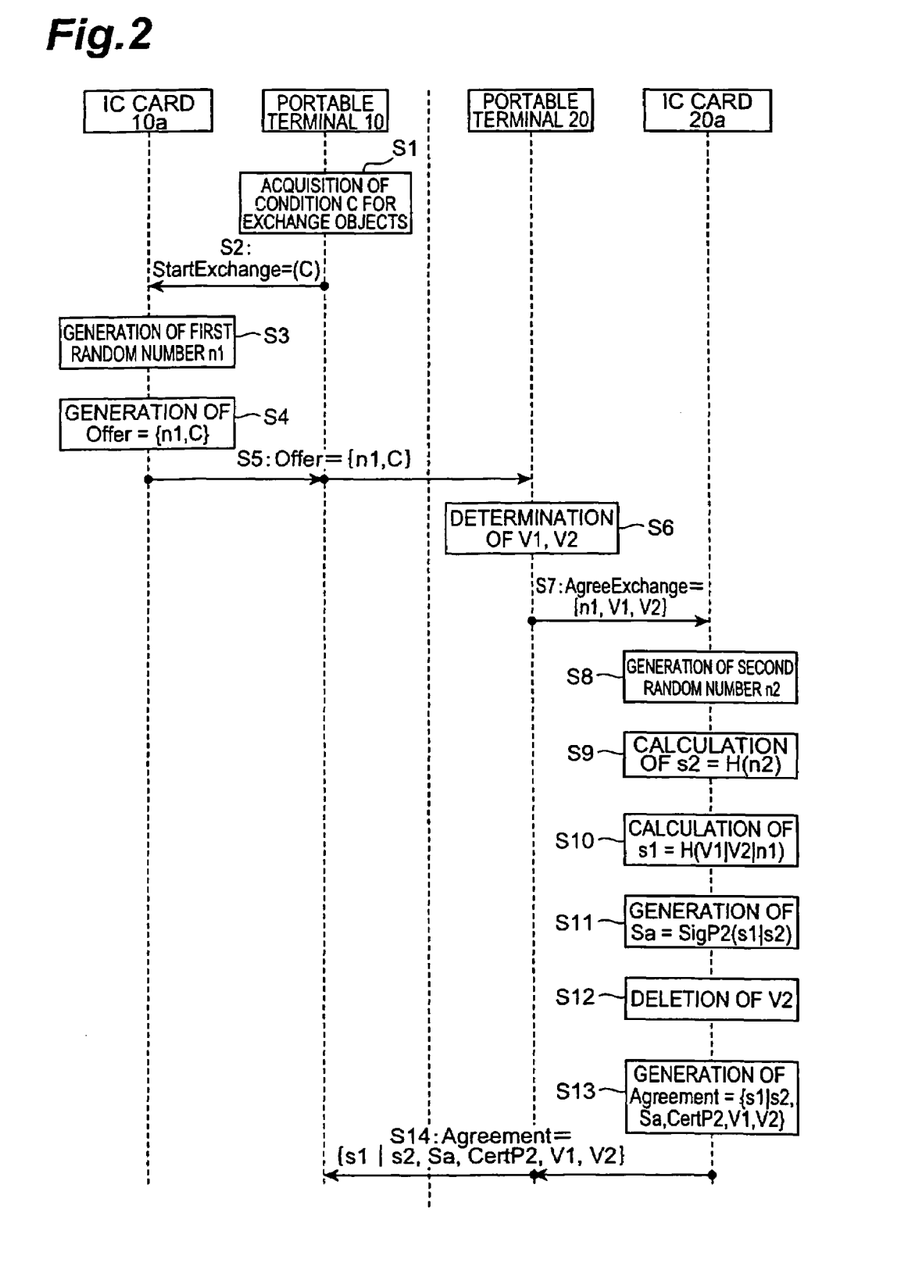
FIG. 2 is an illustration for explaining the first phase of the operation of the electronic value exchange system according to the present invention.

First, at S1 in FIG. 2, the portable terminal 10 acquires the condition C (corresponding to the condition information) for exchange objects through the exchange object condition acquirer 11 in accordance with user's input manipulation. The condition C for exchange objects includes constituent elements of lists C1, C2 (corresponding to the first condition and the second condition) containing all the electronic values as candidates for exchange objects. In other words, electronic values meeting the condition C for exchange objects, i.e., electronic values in the lists C1, C2 as elements of C can be deemed as the aforementioned electronic values "satisfying the condition C".

The condition C acquired at S1 is fed as a parameter of a Start Exchange signal to IC card 10a (S2). When the IC card 10a receives the input, the data generator 16 thereof generates a first random number n1 (S3), and thereafter generates an Offer signal (={n1,C}) including this n1 and C (S4). The Offer signal thus generated is outputted from the IC card 10a and the data transmitter/receiver 12 transmits it from portable terminal 10 to portable terminal 20 (S5).

The portable terminal 20 receives the Offer signal through the data transmitter/receiver 21 (S5), and the exchange object determiner 22 presents lists C1, C2 of condition C to the user and awaits selection of exchange objects V1, V2. The presentation to the user is, for example, a display on the display device. The selection of exchange objects is designated by the user of portable terminal 20. For example, let us suppose as to the condition C=(C1,C2) that three types of electronic values [V1a,V1b,V1c] are listed as candidates for an exchange object in the list C1 and that two types of electronic values [V2a,V2b] are listed as candidates for an exchange object in the list C2. When the user selects any one electronic value out of the electronic values V1a, V1b, V1c, the selected electronic value becomes an exchange object V1. When the user selects the electronic value V1a, "V1 =V1a". Similarly, the user selects any one electronic value out of the electronic values V2a, V2b, and the selected electronic value becomes an exchange object V2. When the user selects the electronic value V2b, "V2=V2b". As a result, V1 and V2 are determined (S6).

The determined electronic values V1, V2 of exchange objects, together with the random number n1 generated on the portable terminal 10 side, are outputted as an Agree Exchange (={n1,V1,V2}) signal to the IC card 20a (S7). When the IC card 20a receives the Agree Exchange signal, the data generator 25 generates a second random number n2 (S8).

The data generator 25 uses a one-way function to generate session information s2 corresponding to the above n2. Examples of the one-way function to be applicable include safe hash functions such as SHA-1 (Secure Hash Algorithm 1) and MD 5 (Message Digest 5). The session information s2 is calculated as H(n2) (S9). Subsequently, the data generator 25 generates agreement object information s1 by the aforementioned one-way function (S10). The agreement object information s1 can be expressed as s1=H(V1|V2|n1) using V1 and V2 determined at S6, and the random number n1 as parameters. The notation "|" represents a concatenation between character strings.

Furthermore, the data generator 25 generates an electronic signature Sa=SigP2(s1|s2) from s1 and s2 generated at S9 and at S10, respectively (S11). Here SigP2 represents a function for generating an electronic signature that can be verified by the public key P2. For example, it is RSA (Rivest Shamir Adleman) or ECDSA (Elliptic Curve Digital Signature Algorithm). In addition, SigP2(x) is an electronic signature generated for x as a signature object. The electronic signature Sa corresponds to the first electronic signature, and s1|s2 to the first signature object information.

In conjunction with the generation of Sa, V2 (e.g., V2b determined at S6) retained in the electronic value retainer 23 is deleted by the electronic value manager 24 (S12). At S13, the IC card 20a makes the data generator 25 generate an Agreement signal with {s1|s2,Sa,CertP2,V1,V2} as information elements, and instructs the data transmitter/receiver 21 to transmit it. The data transmitter/receiver 21 transmits the foregoing Agreement signal to the portable terminal 10 (S14).

Figure 3:
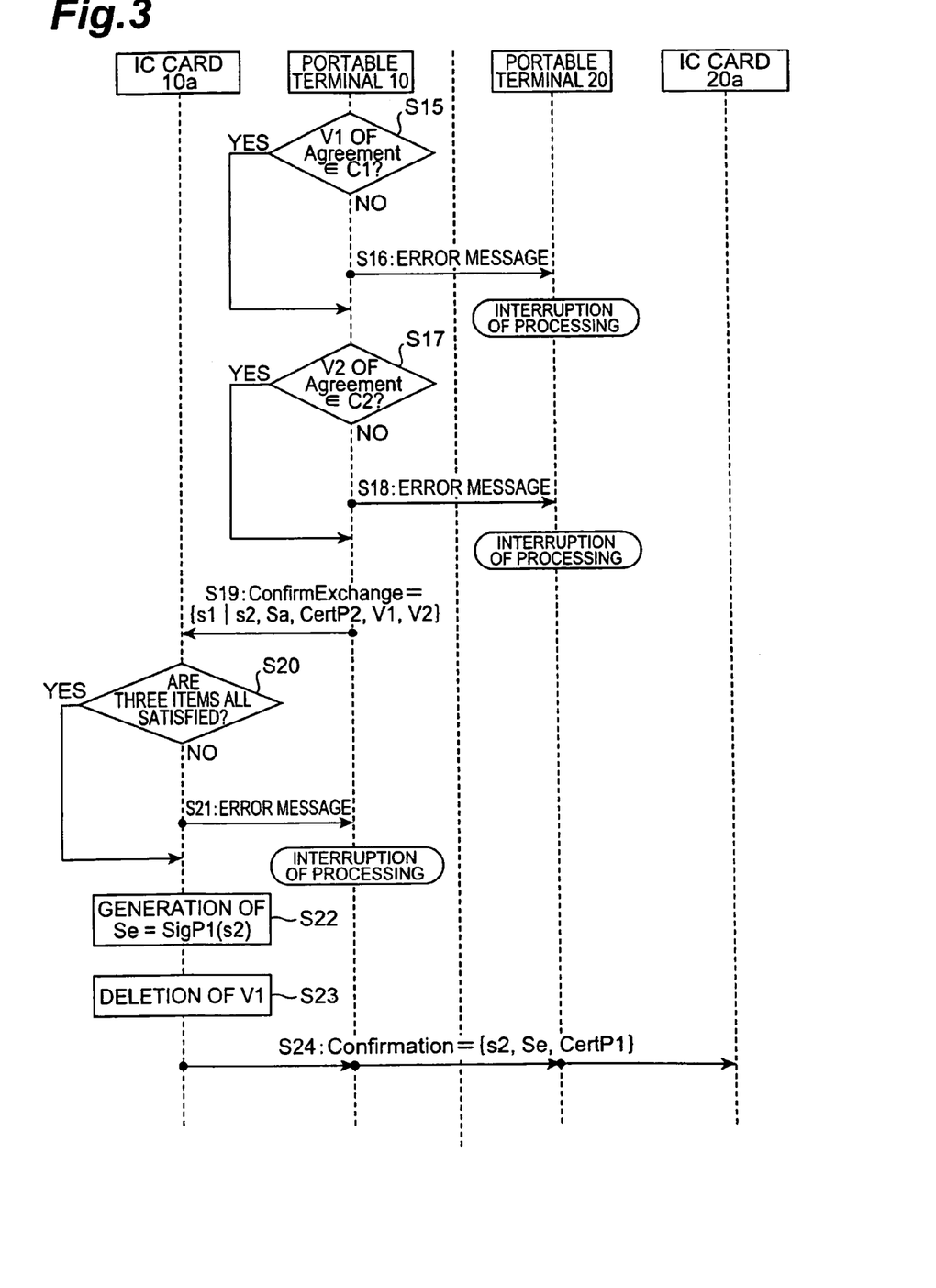
FIG. 3 is an illustration for explaining the second phase of the operation of the electronic value exchange system according to the present invention.

Referring now to FIG. 3, the portable terminal 10, receiving the Agreement signal, confirms whether "V1" contained in the signal belongs to the list C1 of the condition C acquired at S1 (S15). This confirmation process is executed by the data verifier 13. When V1 belongs to C1 (S15; YES), the portable terminal 10 moves to S17. On the other hand, when V1 does not belong to C1 (S15; NO), the portable terminal 10 sends an error message to indicate that, to the portable terminal 20 (S16), thereby interrupting the sequential processing.

S17 and S18 are to execute processes similar to S15 and S16, for "V2" in the Agreement signal. Namely, the data verifier 13 confirms whether "V2" belongs to list C2 and, when it belongs to the list C2, the portable terminal 10 moves to the next process S19. Even if at S15 or S17 the exchange object V1 or V2 is not listed in the list C1 or C2, respectively, and if the user of the portable terminal 10 agrees, the portable terminal 10 can continue the next process, without sending an error.

The Agreement signal received at S14 in FIG. 2 by the portable terminal 10, after subjected to the aforementioned verification process, is outputted as a Confirm Exchange signal to the IC card 10a (S19). In the IC card 10a, the data authenticator 17 performs authentication of the above Confirm Exchange signal {s1|s2,Sa,CertP2,V1,V2} (S20). Authentication items are the following three items.

1) CertP2 is a valid public key certificate certified by a certificate authority.
2) Signature verification of Sa=SigP2(s1|s2) is successfully done by use of P2.
3) A relation of s1=H(V1|V2|n1) holds among s1, V1, V2, and random number n1.

When the Confirm Exchange signal satisfies all the above items, the authentication is successfully completed (S20; YES), and the flow goes to S22. However, if one or more items are not satisfied, the authentication is unsuccessful (S20; NO), and the portable terminal 10 is notified of interruption of processing through an error message (S21). At S22 the data generator 16 generates an electronic signature Se=SigP1(s2). Here SigP1 is a function for generating an electronic signature that can be verified by the public key P1, and is, for example, RSA (Rivest Shamir Adleman) or ECDSA (Elliptic Curve Digital Signature Algorithm). SigP1 (x) is an electronic signature generated for x as a signature object.

In conjunction with the generation of electronic signature Se, V1 as an exchange object is deleted from the electronic value retainer 14 (S23). Thereafter, a Confirmation signal with {s2,Se,CertP1} as elements is transmitted from portable terminal 10 to portable terminal 20 (S24).

Figure 4:
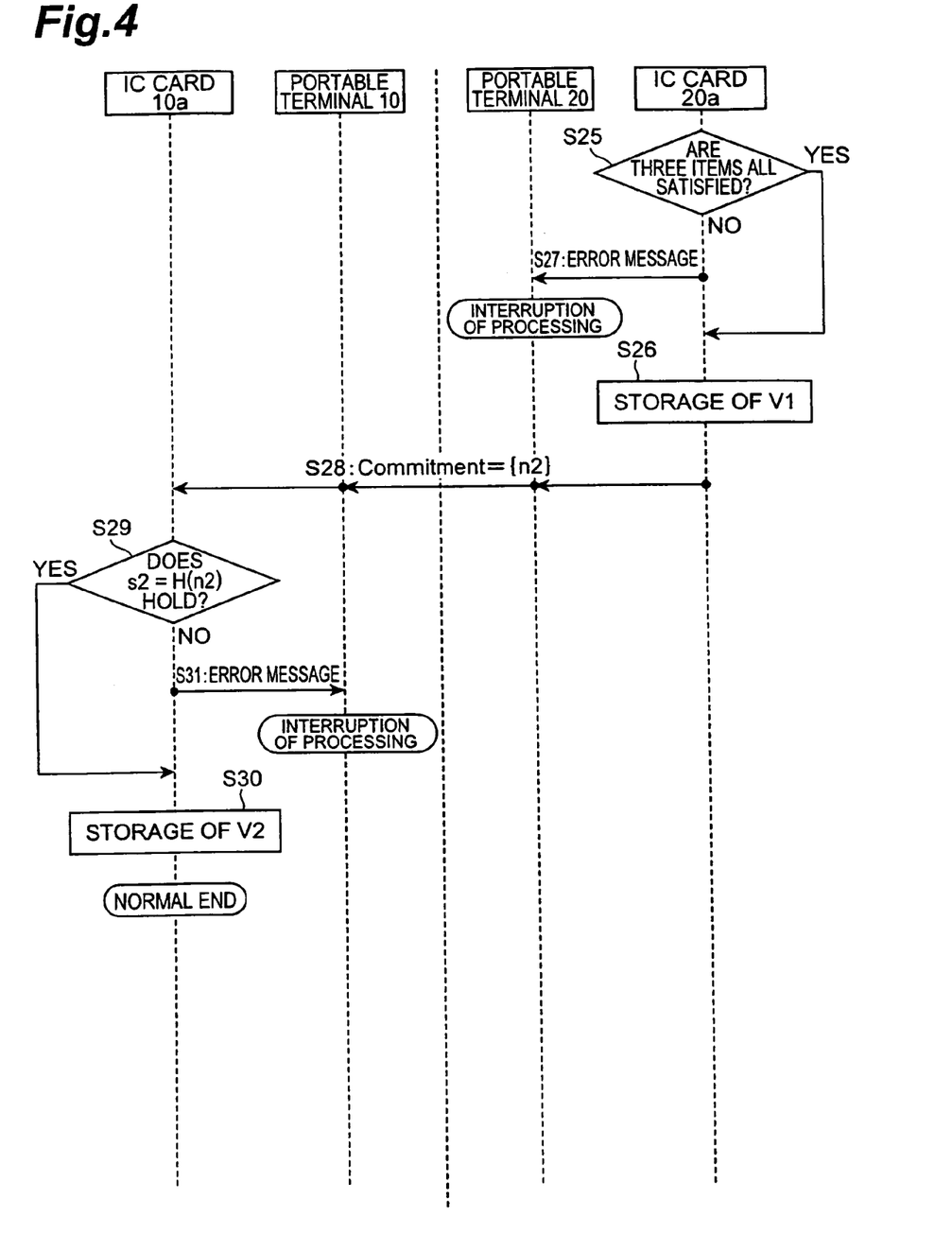
FIG. 4 is an illustration for explaining the third phase of the operation of the electronic value exchange system according to the present invention.

Referring now to FIG. 4, the IC card 20a of the portable terminal 20 makes the data authenticator 26 perform authentication for the foregoing Confirmation signal (S25). The authentication is successfully done if the following three items all are met.

i) CertP1 is a valid public key certificate certified by a certificate authority.
ii) The signature verification of Se=SigP1(s2) is successfully done by use of P1.
iii) A relation of s2=H(n2) holds between s2 and random number n2.

Here the electronic signature Se corresponds to the second electronic signature, and s2 to the second signature object information.

When the Confirmation signal satisfies all the above items, the authentication is successfully done (S25; YES) and the flow moves to S26. At S26, the electronic value manager 24 stores the electronic value V1 determined as an exchange object at S6, into the electronic value retainer 23 (S26). On the other hand, if one or more items are not met, the authentication is unsuccessful (S25; NO), and the portable terminal 20 is notified of interruption of processing (S27). Thereafter, the data transmitter/receiver 21 transmits a Commitment signal with the random number n2 as an element to the portable terminal 10. This Commitment signal is outputted through a bus to the IC card 10a (S28).

The IC card 10a, receiving the Commitment signal, collates the calculation result obtained by substituting the random number n2 in the signal into the predetermined one-way function H, against s2 transmitted at S25, to determine whether the relation s2=H(n2) holds (S29). This determination process is carried out by the data authenticator 17. When it holds (S29; YES), the electronic value V2 of the exchange object (electronic value received at S19) is stored into the electronic value retainer 14 (S30). Then the user of the portable terminal 10 is notified of completion of the exchange. If it does not hold (S29; NO), the user is notified of interruption of processing through an error message (S31).

As described above, the electronic value exchange system 1 of the present embodiment enables the highly flexible and convenient exchange of electronic values, without loss of security. For example, let us suppose a case where the user of the portable terminal 20 has such preference that "V2a may be exchanged for V1b but not for V1a". If the conventional technology is applied to this case, the portable terminal 10 must once interrupt the electronic value exchange process started with the portable terminal 20 and again execute a new process. With the electronic value exchange system 1 of the present embodiment, after the start of the electronic value exchange process, the portable terminal 20 selects exchange objects out of electronic values satisfying the condition C presented by the portable terminal 10, during the process. Namely, the portable terminal 20 selects electronic values V1b, V2a as exchange objects V1, V2 out of a plurality of electronic values listed in the lists C1, C2 of the condition C. This permits the exchange of V2a for V1b, without interruption of the once started processing.

In order to implement the exchange of electronic values between IC cards 10a, 20a, it is necessary to perform the processes of deletion of V1 and storage of V2 in the IC card 10a and the processes of deletion of V2 and storage of V1 in the IC card 20a. Among these, the deletion process of V1 is not executed unless the conditions listed above at S20 are met, and the storage process of V1 is not executed unless the conditions listed above at S25 are met. In addition, the storage process of V2 is not executed unless the verification at above S29 is successfully done. Namely, the exchange of exchange objects V1 and V2 is normally completed only if the two IC cards succeed in mutual authentication. This maintains a high security level even in cases where the user is allowed to select any exchange objects satisfying the conditions.

The mode described in the present embodiment is just a preferred example of the electronic value exchange system according to the present invention, and the present invention is by no means limited to this mode. For example, the above embodiment adopted the condition that the electronic values as exchange objects were listed in the lists C1, C2 being the elements of C, as the condition C for electronic values as exchange objects, but, instead of such direct designation, it is also possible to use a criterion about an attribute of each electronic value. For example, it is also possible to set as the condition C for electronic values, e.g., a value is not less than a predetermined value, an issue date or an expiration date is after a predetermined date, or a scope of use or a user satisfies predetermined conditions.

The disclosure of Japanese Patent Application No. 2005-071744 filed Mar. 14, 2005 including specification, drawings and claims is incorporated herein by reference in its entirety.

What is claimed is:

1. An electronic value exchange system for implementing an exchange of electronic values stored in a first storage device of a first communication terminal and in a second storage device of a second communication terminal, respectively, the first communication terminal comprising:

output means for acquiring condition information containing a first condition for a first electronic value as an exchange object on the first communication terminal, and a second condition for a second electronic value as an exchange object on the second communication terminal, and for outputting the condition information to the first storage device; and transmitting means for transmitting offer information containing the condition information and a first random number generated by the first storage device, to the second communication terminal;

the second communication terminal comprising:

determining means for determining the first and second electronic values as exchange objects, using the condition information contained in the offer information transmitted by the transmitting means;

the second storage device comprising:

generating means for performing:

generation of session information from a second random number generated by the second storage device;

generation of agreement object information from the first and second electronic values and the first random number; and generation of a first electronic signature from first signature object information using the session information and the agreement object information; and managing means for deleting the second electronic value;

the second communication terminal further comprising:

transmitting means for transmitting agreement information containing the first signature object information, the first electronic signature, and the first and second electronic values, to the first communication terminal;

the first communication terminal further comprising:

verifying means for verifying the agreement information and for outputting the agreement information as confirmation request information to the first storage device;

the first storage device further comprising:

authenticating means for performing an authentication of the second storage device, based on whether the first electronic signature and the agreement object information contained in the confirmation request information satisfy a predetermined condition;

generating means for, when the authentication is successfully done, generating a second electronic signature from second signature object information using the session information and sending a first confirmation information containing the session information and the second electronic signature, to the second storage device; and managing means for deleting the first electronic value when the authentication is successfully done;

the second storage device further comprising:

authenticating means for performing an authentication of the first storage device, based on whether the second electronic signature and the session information satisfy a predetermined condition, out of the first confirmation information containing the session information and the second electronic signature;

wherein the managing means makes the first electronic value stored in storage means when the authentication is successfully done;

wherein the transmitting means of the second communication terminal transmits second confirmation information containing the second random number to the first communication terminal;

wherein the authenticating means of the first storage device performs an authentication of the second storage device, based on whether the second random number contained in the second confirmation information is one corresponding to the session information of the first signature object information contained in the confirmation request information; and wherein the managing means of the first storage device makes the second electronic value stored in storage means when the authentication is successfully done.

2. The electronic value exchange system according to claim 1, wherein the predetermined condition in the authentication by the authenticating means of the first storage device is a condition including at least that the first electronic signature is a regular signature for the first signature object information and that the agreement object information is one corresponding to the first and second electronic values and the first random number; and wherein the predetermined condition in the authentication by the authenticating means of the second storage device is a condition including at least that the second electronic signature is a regular signature for the second signature object information and that the session information is one corresponding to the second random number.

3. The electronic value exchange system according to claim 1, wherein the first and second communication terminals are portable terminals, and wherein the first and second storage devices are IC cards.

4. An electronic value exchange method of implementing an exchange of electronic values stored in a first storage device of a first communication terminal and in a second storage device of a second communication terminal, respectively, the electronic value exchange method comprising the following steps:

letting the first communication terminal execute:
a step of acquiring condition information containing a first condition for a first electronic value as an exchange object on the first communication terminal and a second condition for a second electronic value as an exchange object on the second communication terminal, and outputting the condition information to the first storage device; and
a step of transmitting offer information containing the condition information and a first random number generated by the first storage device, to the second communication terminal;

letting the second communication terminal execute:
a step of determining first and second electronic values as exchange objects, using the condition information contained in the transmitted offer information;

letting the second storage device execute:
a step of performing:
generation of session information from a second random number generated by the second storage device;
generation of agreement object information from the first and second electronic values and the first random number; and
generation of a first electronic signature from first signature object information using the session information and the agreement object information; and
a step of deleting the second electronic value;

letting the second communication terminal execute:
a step of transmitting agreement information containing the first signature object information, the first electronic signature, and the first and second electronic values to the first communication terminal;

letting the first communication terminal execute:
a step of verifying the agreement information and outputting the agreement information as confirmation request information to the first storage device;

letting the first storage device execute:
a step of performing an authentication of the second storage device, based on whether the first electronic signature and the agreement object information contained in the confirmation request information satisfy a predetermined condition;
a step of, when the authentication is successfully done, generating a second electronic signature from the second signature object information using the session information and sending a first confirmation information containing the session information and the second electronic signature, to the second storage device; and
a step of deleting the first electronic value when the authentication is successfully done;

letting the second storage device execute:
a step of performing an authentication of the first storage device, based on whether the second electronic signature and the session information satisfy a predetermined condition, out of the first confirmation information containing the session information and the second electronic signature; and
a step of storing the first electronic value when the authentication is successfully done;

letting the second communication terminal execute a step of transmitting second confirmation information containing the second random number to the first communication terminal;

letting the first storage device execute a step of performing an authentication of the second storage device, based on whether the second random number contained in the second confirmation information is one corresponding to the session information of the first signature object information contained in the confirmation request information; and letting the first storage device execute a step of storing the second electronic value when the authentication is successfully done.

* * * * *